United States Patent [19]
Albright et al.

[11] 3,808,489
[45] Apr. 30, 1974

[54] COOLED FLUX SHIELD FOR GENERATOR TERMINAL BOX

[75] Inventors: Robert W. Albright; Anthony F. Armor; Madabushi V. K. Chari; Trifon E. Laskaris, all of Schenectady, N.Y.

[73] Assignee: General Electric Company, Schenectady, N.Y.

[22] Filed: Sept. 1, 1972

[21] Appl. No.: 285,753

[52] U.S. Cl. .............................. 310/52, 174/35 CE
[51] Int. Cl. .............................................. H02k 9/00
[58] Field of Search ............ 310/54, 52, 55, 64, 65, 310/71; 174/35 CE; 200/147; 336/84

[56] References Cited
UNITED STATES PATENTS

| | | | |
|---|---|---|---|
| 2,828,428 | 3/1958 | Baudry | 310/64 |
| 2,742,582 | 4/1956 | Bahn | 310/52 |
| 3,546,358 | 12/1970 | Pohl | 174/35 CE |
| 3,435,262 | 3/1969 | Bennett | 310/54 |
| 3,711,622 | 1/1973 | Deno | 174/35 CE |
| 2,683,227 | 6/1954 | Beckwith | 310/55 |
| 2,742,583 | 4/1956 | Beckwith | 310/64 |

FOREIGN PATENTS OR APPLICATIONS

| | | | |
|---|---|---|---|
| 289,957 | 5/1928 | Great Britain | 174/35 CE |

*Primary Examiner*—R. Skudy
*Attorney, Agent, or Firm*—John F. Ahern; James W. Mitchell

[57] ABSTRACT

The terminal box for the high voltage bushings of a dynamoelectric machine is provided with special flux sheilds to reduce overheating of the terminal box walls caused by circulating currents due to stray flux from the high voltage bushings. The flux shield and terminal box walls are cooled by gas flowing through special passages between them.

6 Claims, 3 Drawing Figures

COOLED FLUX SHIELD FOR GENERATOR TERMINAL BOX

BACKGROUND OF THE INVENTION

This invention relates generally to the terminal box which leads the high voltage bushings from a large dynamoelectric machine, such as a hydrogen- and liquid-cooled turbine-generator. Stray magnetic flux from the phase leads and neutral leads as they are carried through the terminal box by the high voltage bushings will impinge upon the walls of the terminal box and cause circulating currents. This can lead to overheating of the terminal box walls in some locations depending upon orientation of the walls and their location with respect to the bushings.

The use of flux shields in various portions of a dynamoelectric machine is well known. These generally consist of sheets of conductive material placed between the source of stray flux and the member which is to be shielded. Circulating currents are set up in the flux shield itself which then tend to repel stray flux from entering the shielded member. An example of a flux shield for the lamination clamping fingers of a dynamoelectric machine may be seen in U.S. Pat. No. 1,645,070 - Pohl, while a liquid-cooled flux shield for the end plate of a dynamoelectric machine may be seen in U.S. Pat. No. 3,435,262 - Bennett et al.

For a clearer understanding of the environment of the present invention, reference is made to U.S. Pat. No. 2,742,582 to Bahn et al., assigned to the present assignee, which is incorporated herein by reference. The Bahn et al. patent shows a terminal box attached to a dynamoelectric machine with high voltage bushings cooled by the cooling gas utilized to cool the dynamoelectric machine proper. The present invention is an improvement over the simple terminal box shown in the Bahn et al. patent.

Accordingly, one object of the present invention is to provide an improved terminal box for a dynamoelectric machine bushings which reduces heating of the terminal box walls.

Another object of the invention is to provide an improved, cooled flux shield for a dynamoelectric machine terminal box.

SUMMARY OF THE INVENTION

Briefly stated, the invention comprises the addition of a flux shielding member between the high voltage bushings and the terminal box walls. The shield is spaced from the walls and means are provided for inducing a flow of cooling gas to cool both the walls and the flux shield. The shield is arranged to create the greatest cooling at the location where overheating is most likely to occur.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

DESCRIPTION OF THE PREFERRED EMBODIMENT

Figure 1:
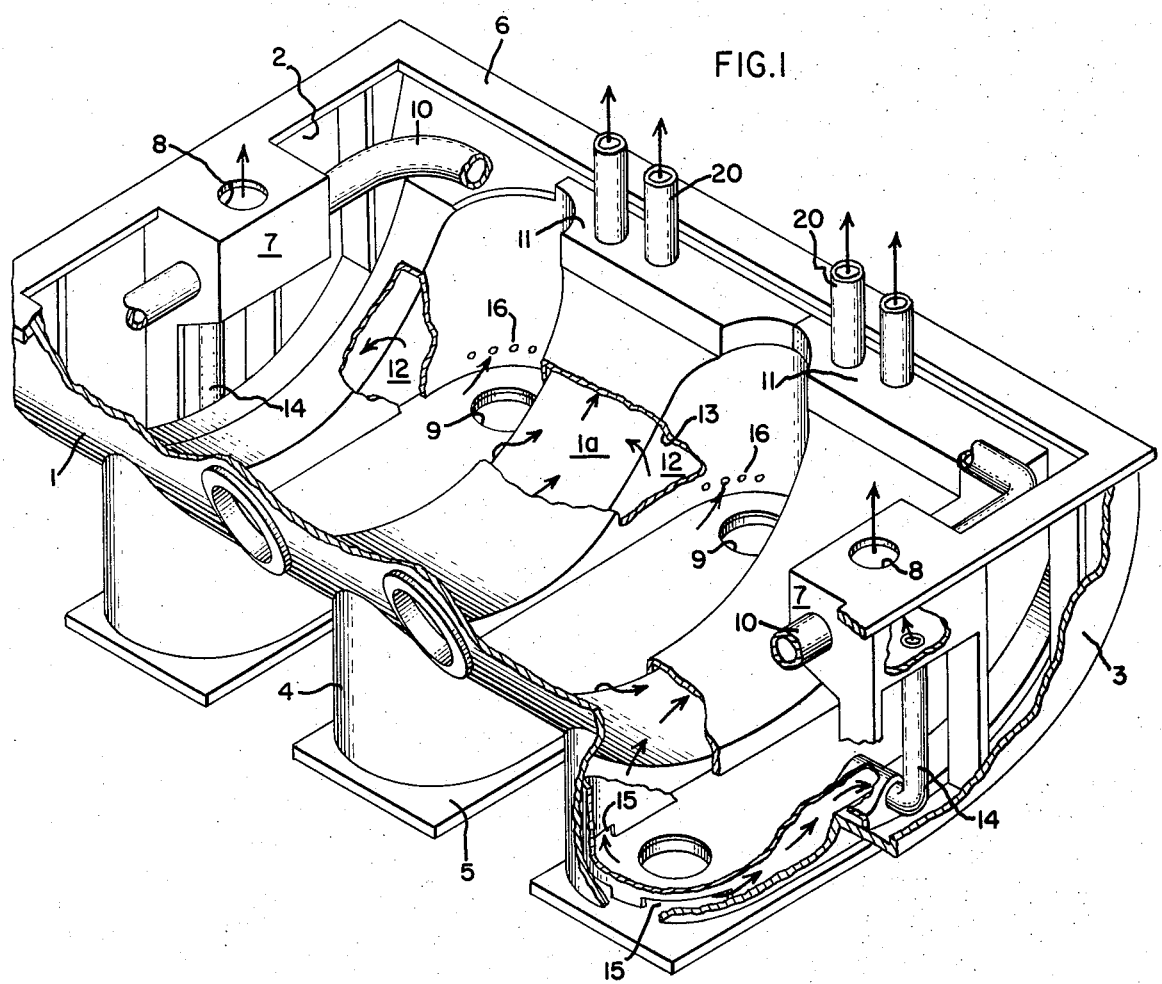
FIG. 1 is an isometric drawing of the terminal box with the high voltage bushings and the bushing cooling system omitted for clarity.

Referring now to FIG. 1 of the drawing, the terminal box is seen to comprise a tub-shaped enclosure made up of a curved body wall 1, approximating a segment of a cylinder, end walls 2 and three downwardly extending phase-pair enclosure walls 4, each covered by a flat plate 5. The upper rim of the terminal box is provided with a flange 6 which, by means of appropriate gaskets and bolt holes (not shown), the terminal box is secured to the underside of a dynamoelectric machine, as indicated in the aforementioned Bahn et al. patent. Also as indicated in the Bahn et al. patent, the open top of the terminal box is connected to a source of cooling gas, since it communicates with the high pressure or discharge side of the conventional cooling fan which circulates cooling gas through the dynamoelectric machine.

Each end of the terminal box is provided with a suction manifold 7 with discharge ports 8 connected by means of piping (not shown) to other chambers in the dynamoelectric machine communicating with the suction side of its cooling fan.

A pair of holes 9 in the bottom plate of each phase-pair enclosure 4 permit the line bushing and the neutral bushing for each phase to leave the dynamoelectric machine in a manner indicated in the Bahn et al. patent. The bushings themselves and their cooling systems are omitted in FIG. 1 in order not to obscure the details of the present invention. Briefly, however, the bushings have internal passageways for cooling gas which flows from the open interior of the terminal box, into the bushings, and out through the discharge conduits connected to the suction manifold 7, by means of pipes such as shown at 10 in FIG. 1. The cooling details of the bushings are immaterial to the present invention.

In order to provide additional cooling capability for the flux shield of the present invention, two additional suction manifolds 11 are provided on one side of the box. These are provided with pipes 20 arranged to communicate with the suction side of the dynamoelectric machine fan in the same manner as for suction manifolds 7.

The most critical portions of the terminal box subject to possible overheating are the vertical wall portions 12 of the phase-pair enclosures which are connected by cylindrical portions 1a of the body wall 1. These vertical walls 12 are relatively narrow in their centers and are considerably wider on either side of the terminal box. The general shape of wall portions 12 may be seen in FIG. 2.

In accordance with the present invention, a flux shield 13 is added to the terminal box which comprises a relatively thin sheet of electrically conductive material shaped to conform generally to the curvature of vertical walls 12 and the connecting portions 1a. Shield 13 is secured in the box so as to be spaced from wall portions 12, 1a. On one side of the box, the upper edges of the flux shield 13 join with the walls of the two suction manifolds 11 so that the manifolds connect to the space between the flux shield and the walls of the terminal box. On the ends of the terminal box, special pipes 14 connect the space between the flux shield and the terminal box walls with the suction manifolds 7. On the side of the box opposite manifolds 11, cutouts 15 in the bottom edge of the flux shield 13 provide admission of fairly large quantities of cooling gas. Additional small metered quantities of gas are admitted by means of holes 16 on the side of the box with the suction manifolds 11.

Figure 3:
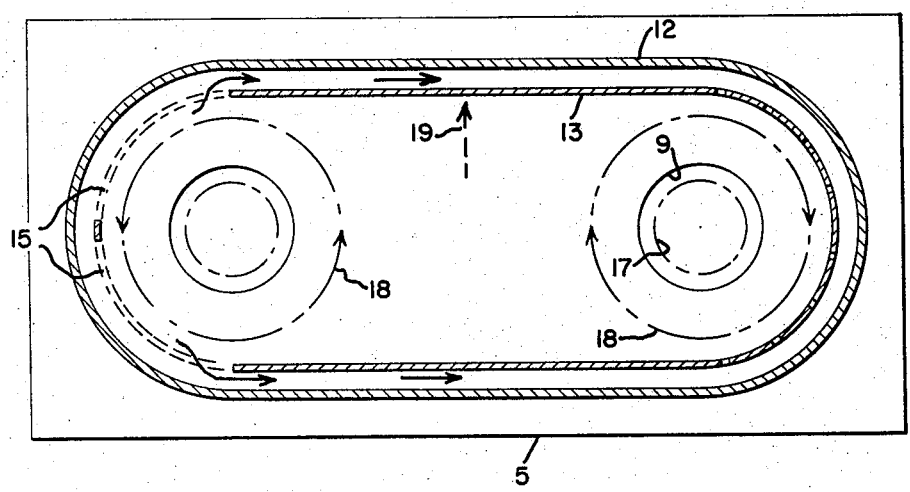
FIG. 3 is a plan view, in section taken along lines III—III of FIG. 2.
Figure 2:
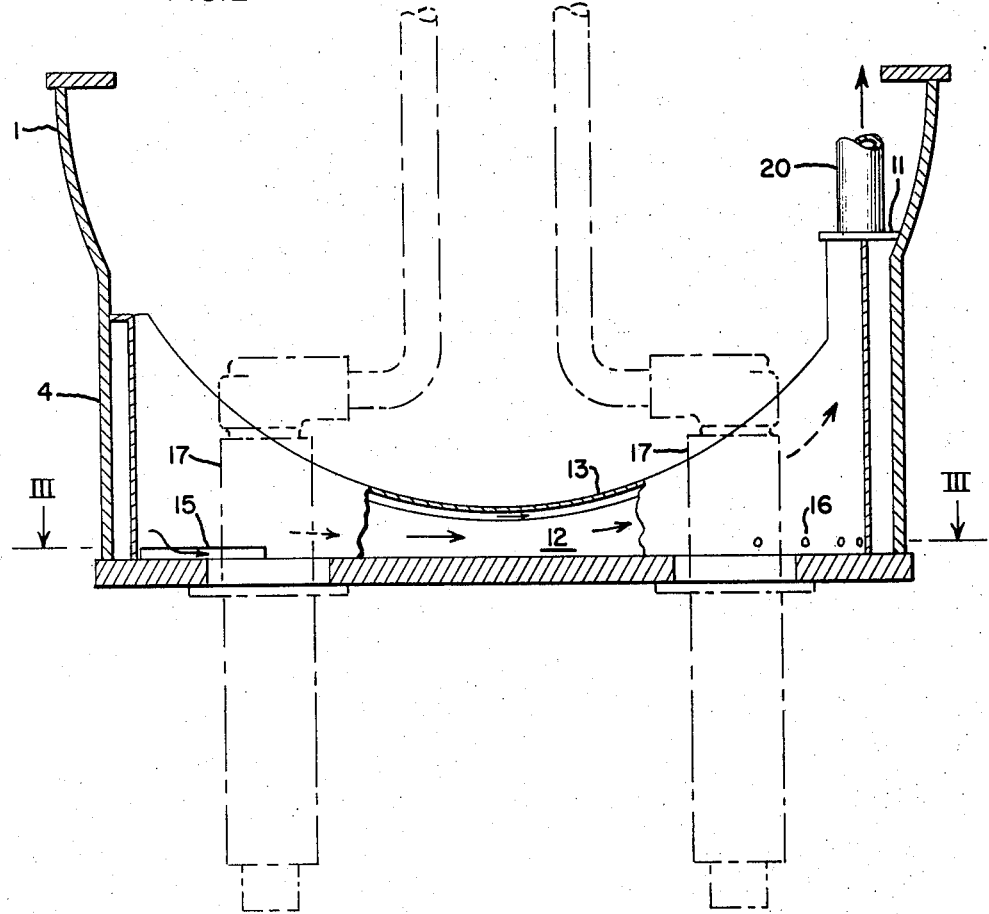
FIG. 2 is a sectional elevation drawing taken through the portion of the terminal box carrying a pair of bushings.

A better understanding of the invention will be had by reference to FIGS. 2 and 3 of the drawing which are elevation and plan sectional views, respectively, through one of the phase-pair enclosures. The phase bushings are indicated by phantom lines 17. As indicated in FIG. 3, at any one instant of time, the current flow through the two bushings from any of the phase windings is in opposite directions, with flux linkages indicated at 18. These opposing linkages substantially cancel one another, but due to the physical sizes and separation of the bushings, there are elements of stray leakage flux schematically illustrated at 19 which impinge upon the sidewalls 12, the most severe condition being at a point midway between the bushings in the vertical wall portion 12.

OPERATION OF THE INVENTION

In accordance with the present invention, the stray leakage flux 19 impinges upon the walls of flux shield 13 and creates circulating currents therein which tend to oppose the passage of flux into the wall portions 12, although flux also enters walls 12 with a lesser intensity to cause some circulating current therein as well. Hence, the walls of flux shield 13 (and also terminal box walls 12, but to a much lesser extent than previously) are heated by the circulating currents.

As shown in FIGS. 2 and 3, cooling gas enters the cutouts 15 and flows through the space between the flux shield 13 and wall portions 12 and 1a toward the suction pipes 20. An additional metered flow of gas enters holes 16 and flows into pipes 20. The pattern is somewhat the same at the ends of the terminal box (see FIG. 1) except that gas flows from cutouts 15 through pipes 14 into suction manifolds 7.

The passageway between the flux shield and the terminal box walls when going from one side of the box to the other first decreases in cross section to a minimum cross-sectional area at the center of the box, and then increases. This central portion of the vertical wall 12 has the most severe tendency to overheat, and the arrangement of the cooling gas passage is such that this is also the point where the cooling gas flows at the greatest velocity due to the decreased cross section. Hence, the greatest cooling takes place at the point of greatest tendency to overheat, with the result of a more uniform temperature distribution throughout.

The foregoing arrangement of a cooled flux shield greatly improves the design of a terminal box for a dynamoelectric machine. While there has been described what is considered to be the preferred embodiment of the invention, other modifications will occur to those skilled in the art, such as utilizing other cooling fluids, including liquids, and it is desired to secure in the appended claims all such modifications as fall within the true spirit and scope of the invention.

What is claimed is:

1. In a terminal box for a multi-phase dynamoelectric machine having high voltage terminal bushings passing therethrough and having wall portions subject to heating from stray leakage flux from said bushings, the improvement comprising:
   a flux shielding member interposed between said bushings and said wall portions and spaced from the wall portions to define cooling passages therebetween, and
   means causing a flow of cooling fluid through said cooling passages between said shielding member and said wall portions for removing heat therefrom.

2. The combination according to claim 1, wherein said cooling passages are decreased in cross section to provide increased flow velocity of cooling fluid along wall portions which are subjected to the greatest stray leakage flux.

3. The combination according to claim 1, wherein said cooling-fluid-flow-causing means comprises:
   a source of cooling gas from the dynamoelectric machine communicating with said bushings,
   openings in said flux shield leading to said cooling passages between the flux shield and the wall portions, and
   a suction conduit connected to said space between the flux shield and the wall portions to draw gas through said cooling passages.

4. The combination according to claim 1, wherein said wall portions and bushings are vertical and wherein the wall portion is narrowest at a point midway between a pair of bushings for each phase.

5. A terminal box for a three-phase dynamoelectric machine of the type having a fan for circulating cooling gas therethrough and having three phase-pairs of high voltage bushings for conducting current from the dynamoelectric machine, said terminal box comprising:
   a tub-like enclosure having a main wall adapted for connection to the underside of said dynamoelectric machine,
   three phase-pair enclosures adapted to carry a pair of high voltage bushings from the bottom of said terminal box and having vertical enclosing wall portions depending from said main wall,
   the interior of said terminal box communicating with the high pressure discharge side of the dynamoelectric machine fan,
   a flux shielding member comprising electrically conductive wall portions interposed between said bushings and the terminal box walls and spaced therefrom to provide a plurality of cooling passages from one side of the terminal box to the other,
   suction manifold means connected to communicate with said cooling passages and connected to communicate with the suction side of the dynamoelectric machine fan,
   said flux shield having a plurality of openings therein on the side of said terminal box opposite said suction manifold means to admit cooling gas to flow through the cool cooling passages into said suction manifold and thereby cool both the flux shield and the shielded terminal box walls.

6. The combination according to claim 5, wherein said cooling passages midway between each phase-pair of bushings have the smallest cross section to thereby increase the velocity of cooling gas.

* * * * *